(12) United States Patent
Nishikawa

(10) Patent No.: US 8,447,945 B2
(45) Date of Patent: May 21, 2013

(54) STORAGE APPARATUS AND STORAGE SYSTEM INCLUDING STORAGE MEDIA HAVING DIFFERENT PERFORMANCES

(75) Inventor: Norifumi Nishikawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 299 days.

(21) Appl. No.: 12/810,691

(22) PCT Filed: Jun. 14, 2010

(86) PCT No.: PCT/JP2010/003940
§ 371 (c)(1),
(2), (4) Date: Jun. 25, 2010

(87) PCT Pub. No.: WO2011/158280
PCT Pub. Date: Dec. 22, 2011

(65) Prior Publication Data
US 2011/0307678 A1    Dec. 15, 2011

(51) Int. Cl.
*G06F 12/00* (2006.01)

(52) U.S. Cl.
USPC ............ 711/165; 711/117; 711/170; 711/203

(58) Field of Classification Search
None
See application file for complete search history.

(56) References Cited

U.S. PATENT DOCUMENTS

| 2006/0085471 | A1 | 4/2006 | Rajan et al. |
| 2007/0174574 | A1 | 7/2007 | Kano |
| 2008/0104350 | A1 | 5/2008 | Shimizu et al. |
| 2009/0070541 | A1* | 3/2009 | Yochai .......................... 711/165 |

OTHER PUBLICATIONS

L. Paton, et al "Storage Options for Petabytes of Data", Advanced Software and Control for Astronomy II, Proc. of SPIE vol. 7019, 2008, pp. 1-9.
http://partners.netapp.com/go/techontap/mat1/space_reclamation.html , obtained on Apr. 20, 2010, Tech OnTap Nov. 2007, pp. 6-8.

* cited by examiner

*Primary Examiner* — Shawn X Gu
(74) *Attorney, Agent, or Firm* — Brundidge & Stanger, P.C.

(57) ABSTRACT

A storage apparatus maintains a performance even if an unused storage area is not released. The storage apparatus includes a plurality of types of storage media, each having different performances, and moves the unused storage area to the storage medium having a low performance.

12 Claims, 14 Drawing Sheets (a) Before movement

Move empty block (b) After movement

FIG. 2

| Virtual volume number | Virtual block number | Physical volume number | Physical block number |
|---|---|---|---|
| 1 | 1 | 1 | 1 |
| 1 | 2 | 1 | 2 |
| 1 | 3 | 1 | 3 |
| 2 | 1 | 1 | 4 |
| 2 | 2 | 2 | 1 |

FIG. 3

| Physical volume number | Medium class |
|---|---|
| 1 | High-performance medium |
| 2 | Low-performance medium |

FIG. 4

| WWN | Virtual volume number |
|---|---|
| WWN1 | 1 |
| WWN2 | 2 |

| Virtual volume number 1211 | Virtual block number 1212 | Physical volume number 1213 | Physical block number 1214 | 121 |
|---|---|---|---|---|
| 1 | 1 | 1 | 1 | |
| 1 | 2 | 2 | 2 | |
| 1 | 3 | 1 | 3 | |
| 2 | 1 | 2 | 3 | |
| 2 | 1 | 2 | 1 | |

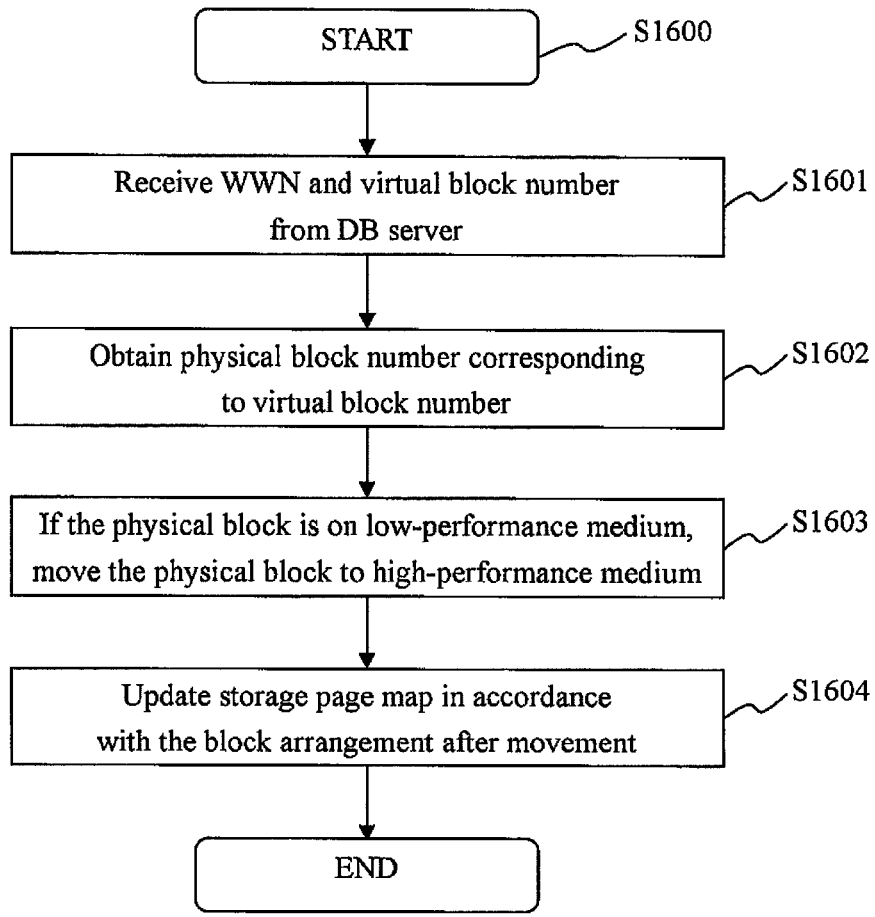

FIG. 20

| Virtual volume number | Virtual block number | Physical volume number | Physical block number |
|---|---|---|---|
| 1 | 1 | 1 | 1 |
| 1 | 2 | 1 | 2 |
| 1 | 3 | 1 | 4 |
| 2 | 1 | 1 | 3 |
| 2 | 1 | 2 | 2 |

STORAGE APPARATUS AND STORAGE SYSTEM INCLUDING STORAGE MEDIA HAVING DIFFERENT PERFORMANCES

TECHNICAL FIELD

The present invention relates to a storage apparatus.

BACKGROUND ART

In recent years, a storage apparatus employing a virtualization technology has been provided. The virtualization technology as herein referred to is a technology for virtualizing a plurality of physical storage devices included in the storage apparatus and presenting the plurality of physical storage devices as a single storage device to a host computer.

The following Non Patent Literature 1 describes an approach in which a user periodically researches an area which can be released by an application, and if the area which can be released is found, the storage apparatus is notified of it. When the storage apparatus recognizes a reusable area from the notification, the storage apparatus collects and reuses the area.

CITATION LIST

Non Patent Literature

NPL 1: http://partners.netapp.com/go/techontap/matl/space_reclamation.html (obtained on Apr. 20, 2010)

SUMMARY OF INVENTION

Technical Problem

In an application in which a storage area is not released and is continued to be reserved even if data on the storage apparatus has been deleted, applying of a technique described in Non Patent Literature 1 is considered. For example, since a database management system (DBMS) does not release the storage area on the storage apparatus and continues to reserve the storage area even if a record in a table is deleted, the database management system (DBMS) corresponds to the above described application.

In the database management system, in a case where there are many storage areas which are not being used on the storage apparatus, even if the approach described in the above described Non Patent Literature 1 is applied, unused storage areas thereof cannot be collected and reused. This is because only the database management system knows whether or not the record of the database exists in the storage area. This situation can also occur in other applications which do not immediately release an unused storage area.

If the storage area which is not being used is continued to be reserved, there is concern that a performance related to a storage capacity of the storage apparatus or the like may be reduced.

The present invention has been made in order to solve a problem as described above, and an object of the present invention is to provide a storage apparatus which can maintain a performance even if an unused storage area is not released.

Solution to Problem

A storage apparatus according to the present invention includes a plurality of kinds of storage media having different performances, and moves an unused storage area to the storage medium having a low performance.

Advantageous Effects of Invention

According to the storage apparatus according to the present invention, a storage area which is not being used is moved to the low-performance storage medium, and thus, while the same performance as before can be maintained for a storage area which is being used, reduction in the performance caused by the unused area can be suppressed. Thereby, the performance as the whole storage apparatus can be maintained.

BRIEF DESCRIPTION OF DRAWINGS

FIG. 2 is a diagram showing a configuration of a storage page map 121 and a data example.

FIG. 3 is a diagram showing a configuration of a medium class table 122 and a data example.

FIG. 4 is a diagram showing a configuration of a WWN management table 123 and a data example.

FIG. 16 is a diagram showing a process flow of the storage area relocation program 351 when the management server 300 has received a notification described in step S1503 from the DB server 210.

FIG. 17 is a diagram showing a data example of the storage page map 121 in Embodiment 3.

FIG. 20 is a diagram showing a data example of the storage page map 121 in a block arrangement shown in FIG. 19.

DESCRIPTION OF EMBODIMENTS

Embodiment 1

Figure 1:
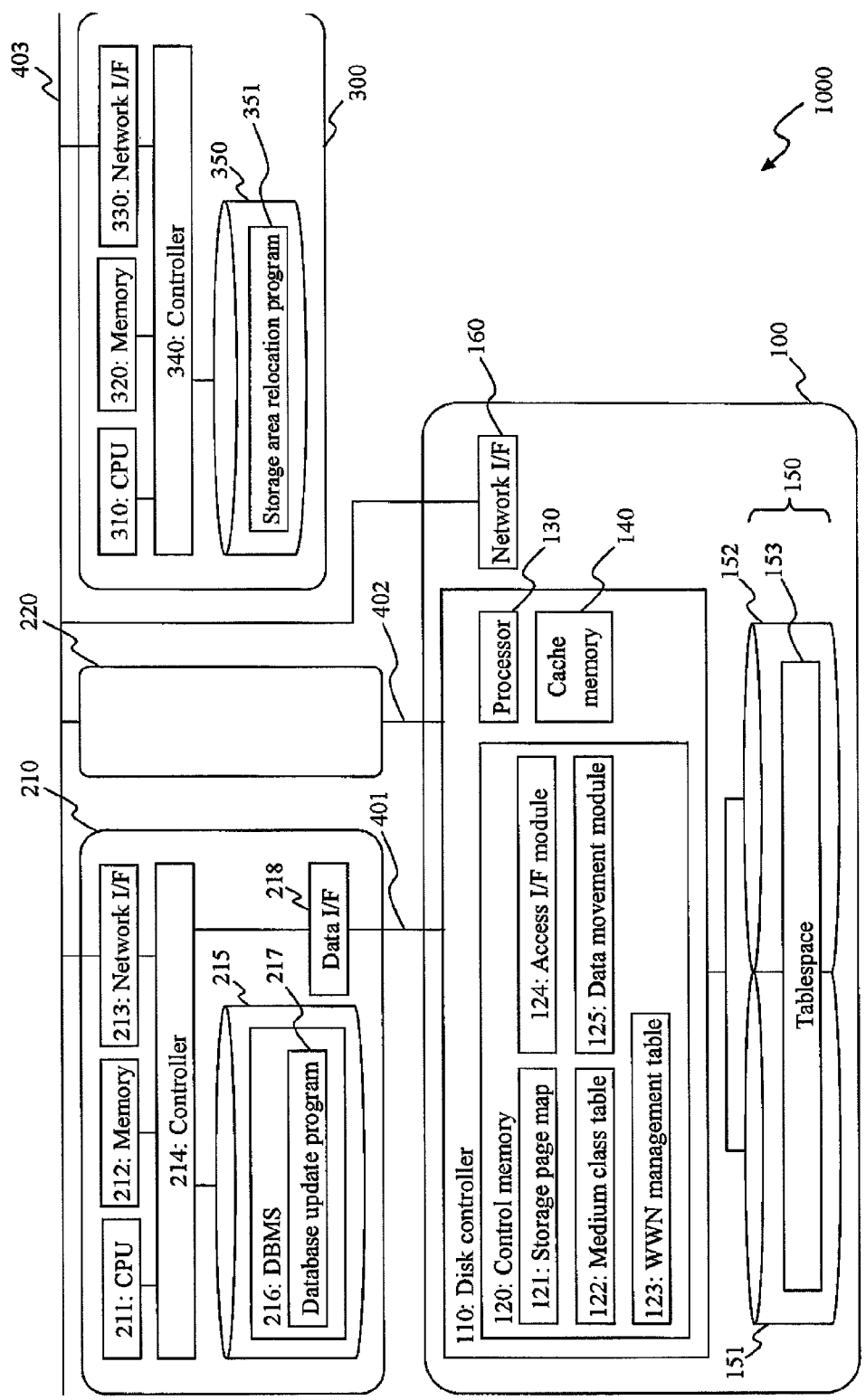
FIG. 1 is a diagram showing a configuration of a storage system 1000 according to Embodiment 1.

FIG. 1 is a diagram showing a configuration of a storage system 1000 according to Embodiment 1 of the present invention. The storage system 1000 has a storage apparatus 100, database (DB) servers 210 and 220, and a management server 300. Since the DB servers 210 and 220 include a similar configuration, only the DB server 210 will be mainly described below. It should be noted that the number of the DB servers may be arbitrary.

In the following description, for convenience of description, a program included in each server or the like may be described as an actor of an action. However, it is noted that each program is actually executed by a processor such as a CPU (Central Processing Unit) included in each server or the like.

The DB servers 210 and 220 are connected to the storage apparatus 100 via data networks 401 and 402, respectively. Moreover, the storage apparatus 100, the DB servers 210 and 220, and the management server 300 are connected via a LAN (Local Area Network) 403. The data networks 401 and 402 are networks via which the DB servers 210 and 220 mainly read/write data from/to the storage apparatus 100. The LAN 403 is a network for mainly transmitting and receiving control commands among the storage apparatus 100, the DB servers 210 and 220, and the management server 300.

The storage apparatus 100 is an apparatus for providing large capacity storage areas to an external apparatus, and includes a disk controller 110, a control memory 120, a processor 130, a cache memory 140, storage devices 151 and 152, and a network I/F 160. Hereinafter, if necessary, the storage devices 151 and 152 are collectively referred to as "storage device 150".

The disk controller 110 controls operations of the storage apparatus 100. In FIG. 1, the control memory 120, the processor 130 and the cache memory 140 are described as components of the disk controller 110. However, they can also be individually configured.

The control memory 120 stores a storage page map 121, a medium class table 122, a WWN management table 123, an access I/F module 124, and a data movement module 125. The storage page map 121, the medium class table 122, and the WWN management table 123 will be further described in FIGS. 2 to 4 later. The access I/F module 124 and the data movement module 125 are software programs executed by the processor 130. Operations thereof will be further described in FIGS. 5 to 6 later.

The processor 130 executes the access I/F module 124 and the data movement module 125, and controls the operations of the storage apparatus 100. Details will be described later. Moreover, the processor 130 uses the storage devices 151 and 152 to configure a virtual storage device, and provides the virtual storage device as a virtual volume to outside of the storage apparatus 100.

The cache memory 140 is used when data is transmitted and received between the storage apparatus 100 and the external apparatus, for use for temporarily retaining the data and subsequently processing the data all together, and the like.

The storage devices 151 and 152 are configured by using different kinds of storage media having different performances, respectively. Here, it is assumed that the storage device 151 is configured by using a high-performance storage medium having a high data input/output performance, and the storage device 152 is configured by using a low-performance storage medium having a lower data input/output performance. For example, the storage device 151 can be configured by using a flash memory, and the storage device 152 can be configured by using a magnetic storage apparatus.

The network I/F 160 is an interface which connects the storage apparatus 100 and the LAN 403.

The DB server 210 is a server apparatus which provides a database function to the external apparatus, and includes a CPU 211, a memory 212, a network I/F 213, a controller 214, a storage apparatus 215, and a data I/F 218. The storage apparatus 215 stores a DBMS 216. Under the DBMS 216, a database update program 217 is located.

The CPU 211 executes the DBMS 216 and the database update program 217 under the DBMS 216, and provides the database function to the external apparatus. Operations of the database update program 217 will be further described later. The DBMS 216 configures a tablespace 153 for storing records of a database, on the virtual storage device provided by the storage apparatus 100.

The memory 212 is a storage device which stores data or the like required when the CPU 211 performs operations. The network I/F 213 is an interface which connects the DB server 210 and the LAN 403. The controller 214 totally controls operations of the DB server 210. The storage apparatus 215 can be configured by using a storage apparatus, for example, such as an HDD (Hard Disk Drive). The data I/F 218 is an interface which connects the DB server 210 and the storage apparatus 100 via the data network 401.

The management server 300 is a server apparatus which manages the operations of the storage apparatus 100, and includes a CPU 310, a memory 320, a network I/F 330, a controller 340, and a storage apparatus 350. The storage apparatus 350 stores a storage area relocation program 351.

The CPU 310 executes the storage area relocation program 351, and relocates storage areas reserved on the storage devices 151 and 152 of the storage apparatus 100. Details will be further described in FIGS. 5 to 6 later.

The memory 320 is a storage apparatus which stores data or the like required when the CPU 310 performs operations. The network I/F 330 is an interface which connects the management server 300 and the LAN 403. The controller 340 totally controls operations of the management server 300. The storage apparatus 350 can be configured by using a storage apparatus, for example, such as an HDD.

FIG. 2 is a diagram showing a configuration of the storage page map 121 and a data example. The storage page map 121 is a table which describes a correspondence relationship between virtualized virtual storage areas which are provided to the external apparatus by the storage devices 151 and 152 and physical storage areas which are internal actual storage areas. The storage page map 121 has a virtual volume number column 1211, a virtual block number column 1212, a physical volume number column 1213, and a physical block number column 1214.

The virtual volume number column 1211 indicates a device number of a virtualized storage device. For an actual storage device, a value of this column corresponds to the number of the storage device 151 or 152. However, due to the virtualization, the value of this column does not necessarily coincide with the number of the actual storage device.

The virtual block number column 1212 indicates a number of a storage area in a virtual storage medium identified by the value of the virtual volume number column 1211. Here, the number of the storage area is distinguished in units of blocks. However, the unit of the storage area to be distinguished may be arbitrary. The same applies to the physical block number column 1214 which is described later. The storage area identified by a value of this column has also been similarly virtualized. The value of the virtual block number column 1212 is uniquely assigned under the same virtual storage medium.

The physical volume number column 1213 indicates a number of a real storage device which actually constitutes the virtual storage device identified by the value of the virtual volume number column 1211. Specifically, the number of the storage device 151 or 152 is set in this column.

The physical block number column 1214 indicates a number of a storage area in a real storage medium identified by a value of the physical volume number column 1213. A value of the physical block number column 1214 is uniquely assigned under the same real storage medium.

The storage page map 121 can be configured, for example, as data in a table format. However, the data may not necessarily be in the table format, as long as similar data can be described. The same applies to the medium class table 122 and the WWN management table 123 which are described later.

FIG. 3 is a diagram showing a configuration of the medium class table 122 and a data example. The medium class table 122 is a table which describes storage medium classes of the storage devices 151 and 152 which are classified in terms of the performances. The medium class table 122 has a physical volume number column 1221 and a medium class column 1222.

The physical volume number column 1221 indicates the number of the storage device 151 or 152. The medium class column 1222 indicates a performance class of the real storage medium identified by a value of the physical volume number column 1221. Here, classifications of "high-performance" and "low-performance" are illustrated, in which the real storage media are classified by a level of a data read/write performance.

FIG. 4 is a diagram showing a configuration of the WWN management table 123 and a data example. The WWN management table 123 is a table which describes a correspondence relationship between the virtual storage medium and a WWN (World Wide Name) thereof. The WWN management table 123 has a WWN column 1231 and a virtual volume number column 1232.

The virtual volume number column 1232 corresponds to the virtual volume number column 1211 of the storage page map 121, and indicates a number of a virtualized storage medium. The WWN column 1231 indicates the WWN of the virtual storage medium identified by a value of the virtual volume number column 1232.

Figure 5:
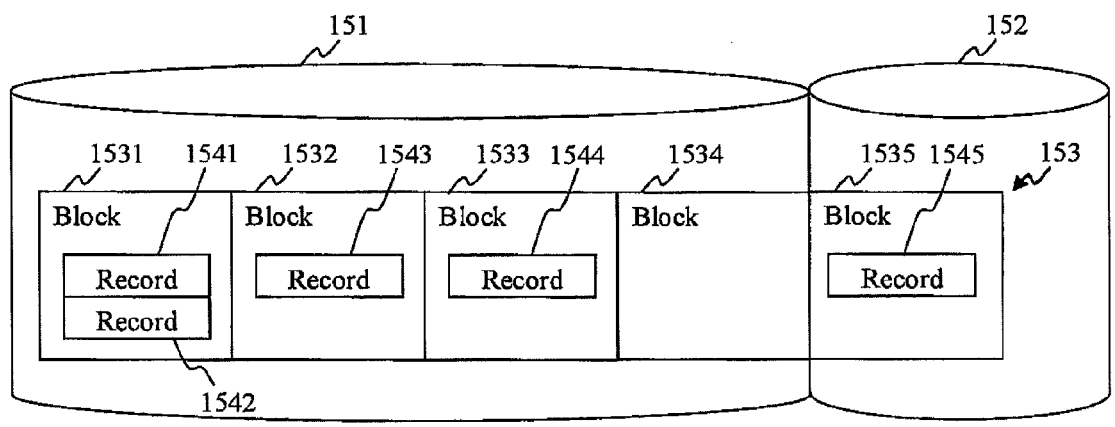
FIG. 5 is a diagram showing a configuration example of a tablespace 153.

FIG. 5 is a diagram showing a configuration example of the tablespace 153. Here, an example corresponding to the data example of the storage page map 121 described in FIG. 2 is shown.

The tablespace 153 is configured with a collection of one or more tablespace blocks. Hereinafter, for ease of explanation, the tablespace blocks constituting the tablespace 153 and physical blocks included in each storage device are handled as equivalent blocks. In other words, one physical block included in each storage device is assumed to be equivalent to one tablespace block of the tablespace 153.

The tablespace 153 can also be configured to be internally divided into a plurality of tablespaces. In terms of dispersion of an access frequency and the like, individual tablespaces may be arranged to be distributed into a plurality of storage devices. However, the storage device as herein referred to is the storage device viewed from the DBMS 216, that is, the virtual storage device.

In FIG. 5, tablespace blocks 1531, 1532, 1533, and 1534 constituting the tablespace 153 are arranged on the storage device 151. A tablespace block 1535 constituting the tablespace 153 is arranged on the storage device 152. In other words, the tablespace 153 is composed of four physical blocks of the storage device 151 and one physical block of the storage device 152.

The tablespace block 1531 stores records 1541 and 1542 of the DBMS 216. The tablespace block 1532 stores a record 1543 of the DBMS 216. The tablespace block 1533 stores a record 1544 of the DBMS 216.

It should be noted that, since the storage devices 151 and 152 have been virtualized, the storage apparatus 100 presents the virtual storage medium and a virtual block to an application such as the DBMS 216. In the following description, it is assumed that the DB server 210 and the management server 300 read/write data from/to the virtual storage medium and the virtual block.

As above, the configuration of the storage system 1000 has been described. Next, the operations of each server and the like will be described with an example of deletion of the record of the DBMS 216.

Figure 6:
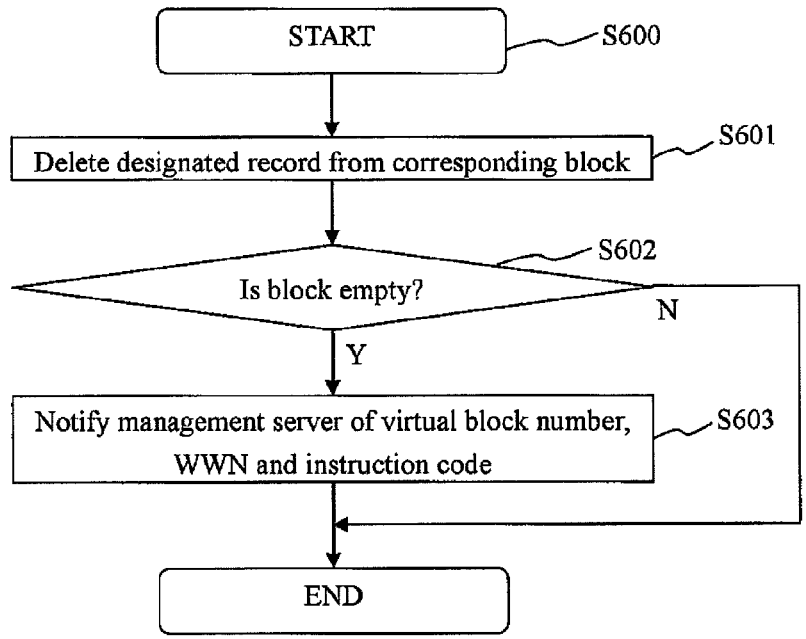
FIG. 6 is a diagram showing a process flow in which a database update program 217 in a DB server 210 deletes a record.

FIG. 6 is a diagram showing a process flow in which the database update program 217 in the DB server 210 deletes the record. Hereinafter, each step of FIG. 6 will be described.

(FIG. 6: Step S600)

The DBMS 216 issues an instruction indicating that the record should be deleted, to the database update program 217. When the database update program 217 receives the instruction from the DBMS 216, the database update program 217 starts this process flow.

(FIG. 6: Step S601)

The database update program 217 receives a number of the record to be deleted, from the DBMS 216, and deletes the record from the corresponding tablespace block. The number of the record to be deleted can be designated, for example, by a number of the tablespace block and a record number in the tablespace block, and the like. The number of the tablespace block as herein referred to corresponds to the virtual block number.

(FIG. 6: Step S601: Supplement)

The deletion of the record in this step is a process in which the record is handled as if the record does not exist, as viewed from the DBMS 216. In other words, the physical block corresponding to the record on the storage apparatus 100 is not released, and merely a pointer to the record or the like is deleted on the DBMS 216 and the record is only logically deleted. Thus, even if the record is deleted on the DBMS 216, the storage area on the storage apparatus 100 is not released, which causes the above described problem.

(FIG. 6: Step S602)

The database update program 217 checks whether or not any record remains in the tablespace block from which the record has been deleted in step S601, that is, whether or not the tablespace block is empty. If the tablespace block is empty, this process flow proceeds to step S603, and if the tablespace block is not empty, this process flow is terminated.

(FIG. 6: Step S603)

The database update program 217 notifies the management server 300 of the number of the tablespace block (=the virtual block) from which the record has been deleted in step S601, the WWN of the virtual storage medium, and an instruction code of a record deletion command.

Figure 7:
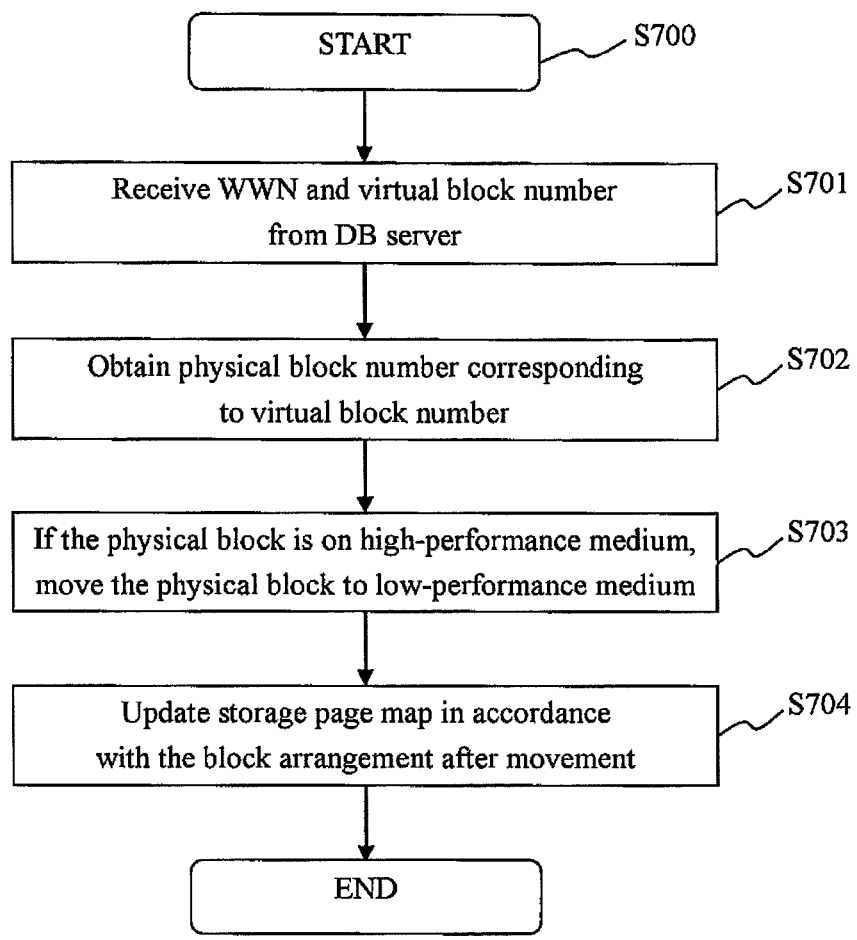
FIG. 7 is a diagram showing a process flow of a storage area relocation program 351 when a management server 300 has received a notification described in step S603 from the DB server 210.

FIG. 7 is a diagram showing a process flow of the storage area relocation program 351 when the management server 300 has received the notification described in step S603 from the DB server 210. Hereinafter, each step of FIG. 7 will be described.

(FIG. 7: Step S700)

When the CPU 310 of the management server 300 receives the notification described in step S603 from the DB server 210, the CPU 310 launches the storage area relocation program 351. The storage area relocation program 351 starts this process flow.

(FIG. 7: Step S701)

The storage area relocation program 351 obtains the WWN, the virtual block number, and the instruction code (the record deletion command), which have been notified by the DB server 210. The WWN corresponds to the number of the virtual storage medium.

(FIG. 7: Step S702)

The storage area relocation program 351 accesses the storage apparatus 100 via the network I/F 330 through the LAN 403. The storage area relocation program 351 uses the WWN and the virtual block number received from the DB server 210, as a key, to inquire the real storage medium and the physical block corresponding to the virtual block. The storage apparatus 100 receives the inquiry via the network I/F 160. The access I/F module 124 uses the WWN and the virtual block number which have been designated, as a key, to search the WWN management table 123 and the storage page map 121, and returns the value of the corresponding physical volume number column 1213 and the value of the corresponding physical block number column 1214.

(FIG. 7: Step S703)

The storage area relocation program 351 uses the value of the physical volume number column 1213 received in step S702, as a key, to inquire a value of the medium class column 1222 of the medium class table 122. As a result of the inquiry, if it is found that the physical block whose number has been obtained in step S702 is located on the high-performance medium, the storage area relocation program 351 instructs the storage apparatus 100 to move the physical block to the low-performance medium. According to the instruction from the management server 300, the data movement module 125 of the storage apparatus 100 moves the physical block from the high-performance medium to the low-performance medium.

(FIG. 7: step S703: Supplement 1)

This step has a purpose of avoiding reduction in a performance of the DBMS 216, which is caused because the tablespace block which does not have any record continues to exist in the high-performance medium.

(FIG. 7: Step S703: Supplement 2)

In this step, the storage area relocation program 351 previously comprehends the number of physical blocks for which the movement is instructed, and saves the number of physical blocks which are being moved, in the memory 320 or the like. If the number of physical blocks for which the movement is simultaneously instructed is larger than a predetermined threshold, the storage area relocation program 351 may divide the instruction to the storage apparatus 100 into a plurality of number of times, or the like so that processes for moving the physical blocks are not too much concentrated within a short time period. In subsequent embodiments, the same applies to a case where the storage area relocation program 351 issues the instruction to the storage apparatus 100.

(FIG. 7: Step S704)

The storage area relocation program 351 instructs the storage apparatus 100 to update the storage page map 121 in accordance with a block arrangement after the physical block is moved. The storage apparatus 100 receives the instruction via the network I/F 160. According to the received instruction, the access I/F module 124 updates the storage page map 121.

(FIG. 7: Steps S700 to S704: Supplement)

In this figure, the storage area relocation program 351 issues the instruction indicating the number of an emptied physical block and indicating that the physical block should be moved to the low-performance medium, to the storage apparatus 100. However, the instruction notified by the storage area relocation program 351 is not limited thereto, and the storage apparatus 100 can be notified that the block should be relocated, and can be notified of arbitrary information required for specifying the block to be relocated. For example, the storage apparatus 100 may be notified of only the number of the emptied physical block. In this case, the data movement module 125 autonomously moves the emptied physical block to the low-performance medium. Also in the subsequent embodiments, similarly, the management server 300 may notify only a result of operating the tablespace 153 by the DBMS 216, and the storage apparatus 100 may autonomously arrange the physical block based on the notification.

Figure 8:
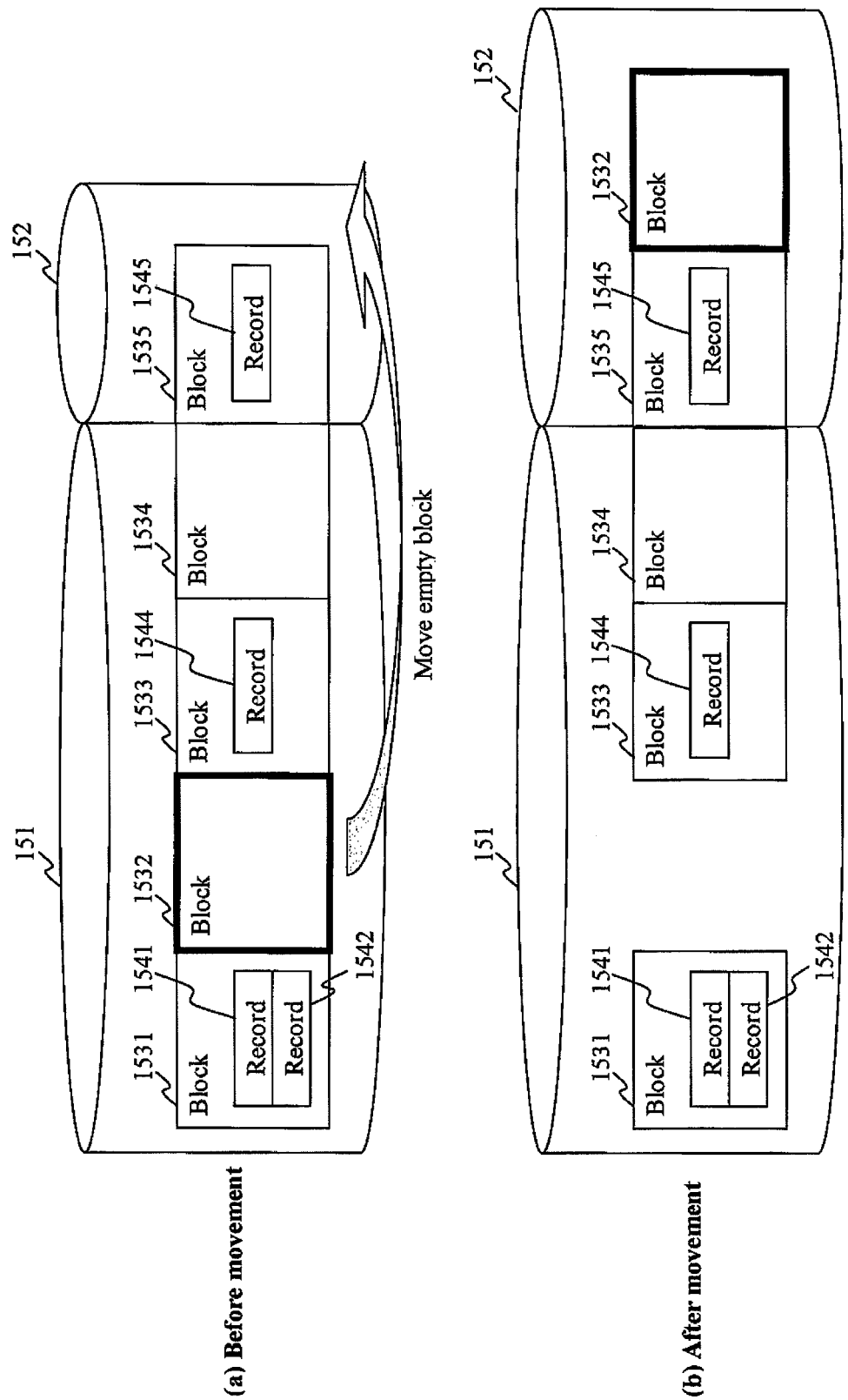
FIG. 8 is a diagram showing a situation where an empty physical block is moved to a low-performance medium according to the process flows of FIGS. 6 to 7.

FIG. 8 is a diagram showing a situation where the empty physical block is moved to the low-performance medium according to the process flows of FIGS. 6 to 7. Here, a block arrangement similar to the tablespace 153 described in FIG. 5 is assumed. FIG. 8(a) shows a state before the block is moved, and FIG. 8(b) shows a state after the block is moved. It should be noted that, for convenience of description, widths of the storage devices 151 and 152 are adjusted as appropriate in FIG. 8.

In the process flow of FIG. 6, it is assumed that the record 1543 of the DBMS 216, which is stored in the tablespace block 1532, has been deleted. While the record 1543 is deleted and disappears, the tablespace block 1532 continues to be reserved as an empty storage area on the storage device 151 (=the high-performance medium).

The storage area relocation program 351 instructs the storage apparatus 100 to move the tablespace block 1532 which has been emptied, onto the storage device 152 (=the low-performance medium) according to the process flow of FIG. 7. The data movement module 125 of the storage apparatus 100 moves the tablespace block 1532 onto the storage device 152.

Figures 9, 10:
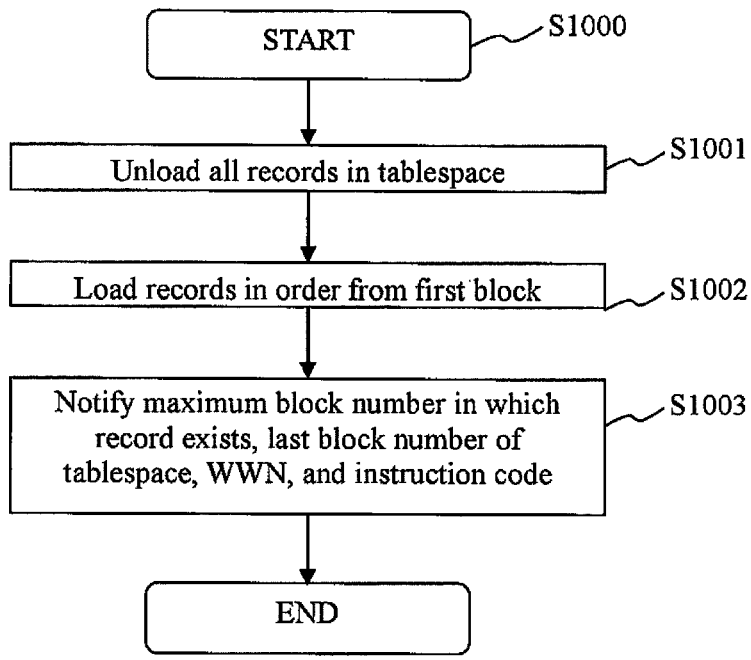
FIG. 9 shows a data example of the storage page map 121 updated by step S704 of FIG. 7.
FIG. 10 is a diagram showing a process flow in which the database update program 217 in the DB server 210 reorganizes the tablespace 153.

FIG. 9 shows a data example of the storage page map 121 updated by step S704 of FIG. 7. Here, an example corresponding to the data example of the storage page map 121 described in FIG. 2 is shown.

In the data example shown in FIG. 2, the physical block corresponding to the tablespace block 1532 corresponds to the physical block of "physical volume number=1" and "physical block number=2". As described in FIG. 8, since this block is moved to the storage device 152 of "physical volume number=2", the value of the corresponding line 2 of the physical volume number column 1213 is updated to "2".

The physical block number in the storage device 152 is assigned so as not to overlap other physical blocks. In the example shown in FIG. 8, since the tablespace block 1532 is relocated as a second physical block of the storage device 152, the value of the physical block number column 1214 becomes "2".

In the above process, the value of the virtual volume number column 1211 and the value of the virtual block number column 1212 are not changed between before and after the physical block is moved. In other words, the virtual volume viewed from the DB server 210 is kept constant. Thereby, an application using the storage apparatus 100 can be prevented from being affected by the movement of the physical block.

Embodiment 1

Conclusion

As described above, when the storage apparatus 100 according to the present Embodiment 1 is notified of the number of the physical block from which the record has been deleted and which has been set in an unused state, the storage apparatus 100 according to the present Embodiment 1 moves the physical block to the low-performance medium. Thereby, it is possible to suppress the reduction in the performance, which is caused because the storage area which is not being used continues to exist in the high-performance medium.

Moreover, in the storage system 1000 according to the present Embodiment 1, a process for moving the physical block on the storage apparatus 100 can also be instructed from the management server 300, and can also be autonomously performed by the storage apparatus 100 in response to the notification of an empty block number. If a configuration in which the instruction is issued from the management server 300 is employed, a processing burden on the storage apparatus 100 can be reduced. Moreover, if the storage apparatus 100 autonomously performs the process, a space where the management server 300 is installed and a burden of equipment such as a communication network can be reduced.

Embodiment 2

In Embodiment 2 of the present invention, the operations of each apparatus when the DBMS 216 in Embodiment 1 reorganizes the tablespace 153 will be described. The reorganization of the tablespace 153 as herein referred to is a process for unloading and releasing the records of the database from the tablespace 153 once, rereading the records into the tablespace 153 again, and thereby organizing the records in the tablespace 153. The reorganization of the tablespace 153 can eliminate fragmentation of the tablespace 153, and can intend to improve the performance of the DBMS 216 and the like.

When the tablespace 153 is reorganized, the records are organized, while an empty tablespace block occurs. Thus, in the present Embodiment 2, the tablespace block arranged on the low-performance medium, in the tablespace blocks in which the records are stored, is moved to the high-performance medium, and the tablespace block arranged on the high-performance medium, in the tablespace blocks in which the records are not stored, is moved to the low-performance medium, and thereby, improvement in a performance of the storage apparatus 100 is intended. The configuration of the storage system 1000 is similar to Embodiment 1.

FIG. 10 is a diagram showing a process flow in which the database update program 217 in the DB server 210 reorganizes the tablespace 153. Hereinafter, each step of FIG. 10 will be described.

(FIG. 10: Step S1000)

The DBMS 216 issues an instruction indicating that the tablespace 153 should be reorganized, to the database update program 217. When the database update program 217 receives the instruction from the DBMS 216, the database update program 217 starts this process flow.

(FIG. 10: Step S1001)

The database update program 217 unloads all the records retained by the tablespace 153. The unloading as herein referred to is to release a connection between the records and the tablespace 153.

(FIG. 10: step S1002)

The database update program 217 reloads the records unloaded in step S1001, and inserts the records into the tablespace blocks in order from a first tablespace block.

(FIG. 10: step S1003)

After the reorganization of the tablespace 153 is executed, the database update program 217 notifies the management server 300 of a maximum number of the tablespace block in which the record exists (maximum block number), a number of a last tablespace block constituting the tablespace 153 (last block number), the WWN, and the instruction code (the reorganization of the tablespace).

Figure 11:
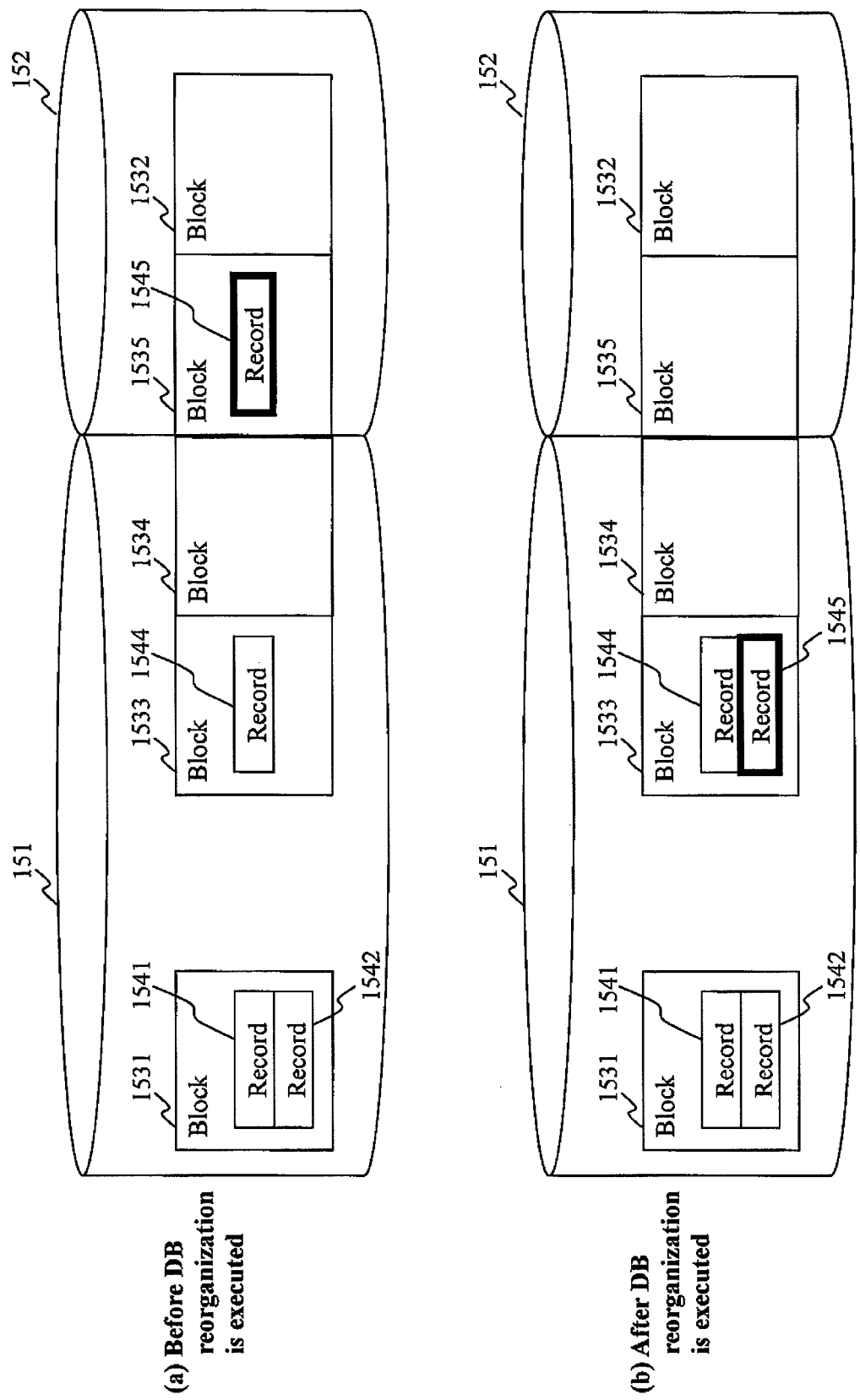
FIG. 11 is a diagram showing a situation where the database update program 217 performs the reorganization of the tablespace 153.

FIG. 11 is a diagram showing a situation where the database update program 217 performs the reorganization of the tablespace 153. Here, it is assumed that the reorganization of the tablespace 153 has been performed after the operations described in FIG. 8 of Embodiment 1. FIG. 11(a) shows a record arrangement on each storage medium before the reorganization is executed, and FIG. 11(b) shows the record arrangement on each storage medium after the reorganization is executed, respectively. Here, it is assumed that one tablespace block can retain two records.

In FIG. 11(a), one record is stored in each of tablespace blocks 1533 and 1535, which thus means that there is vacancy of one record in each tablespace block. The database update program 217 relocates a record 1545 so as to be inserted under the tablespace block 1533.

Figure 12:
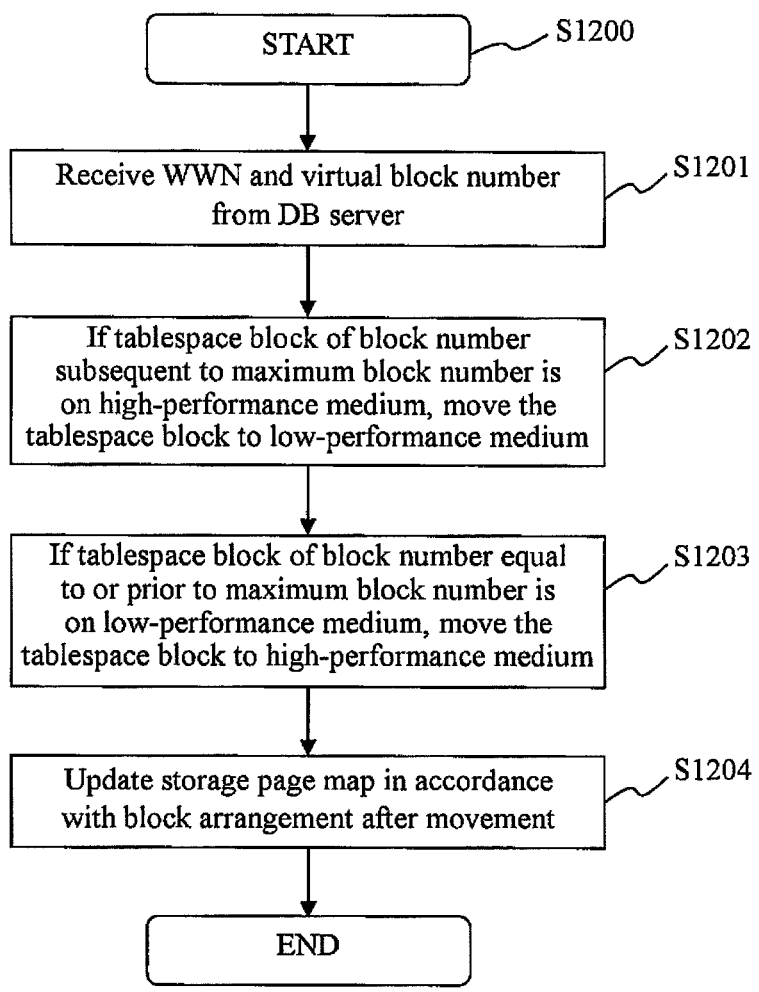
FIG. 12 is a diagram showing a process flow of the storage area relocation program 351 when the management server 300 has received a notification described in step S1003 from the DB server 210.

FIG. 12 is a diagram showing a process flow of the storage area relocation program 351 when the management server 300 has received the notification described in step S1003 from the DB server 210. Hereinafter, each step of FIG. 12 will be described.

(FIG. 12: Step S1200)

When the CPU 310 of the management server 300 receives the notification described in step S1003 from the DB server 210, the CPU 310 launches the storage area relocation program 351. The storage area relocation program 351 starts this process flow.

(FIG. 12: Step S1201)

The storage area relocation program 351 obtains the WWN, the virtual block number, and the instruction code (the rearrangement of the tablespace), which have been notified by the DB server 300.

(FIG. 12: Step S1202)

The storage area relocation program 351 uses a procedure similar to step S702 of FIG. 7 to obtain the storage device on which the tablespace block of the block number subsequent to the above described maximum block number is arranged, from the storage apparatus 100. If the tablespace block of the block number subsequent to the maximum block number is arranged on the high-performance medium, the storage apparatus 100 is instructed to move the tablespace block to the low-performance medium. According to the instruction, the data movement module 125 of the storage apparatus 100 moves the physical block corresponding to the tablespace block, to the low-performance medium.

(FIG. 12: Step S1202: Supplement)

This step has a meaning that the tablespace block in which no record exists and which is not being used is moved to the low-performance medium. This is because no record is arranged in the tablespace block of the block number subsequent to the maximum block number in which the record is arranged, and therefore, it is considered that the performance of the DBMS 216 is not affected even if the tablespace block of the block number subsequent to the maximum block number is moved to the low-performance medium.

(FIG. 12: Step S1203)

The storage area relocation program 351 uses the procedure similar to step S702 of FIG. 7 to obtain the storage device on which the tablespace block of the block number equal to or prior to the above described maximum block number is arranged, from the storage apparatus 100. If the tablespace block of the block number equal to or prior to the maximum block number is arranged on the low-performance medium, the storage apparatus 100 is instructed to move the tablespace block to the high-performance medium. According to the instruction, the data movement module 125 of the storage apparatus 100 moves the physical block corresponding to the tablespace block, to the high-performance medium.

(FIG. 12: Step S1203: Supplement)

This step has a meaning that the tablespace block in which the record exists and which is being used is moved to the high-performance medium. Since the record is arranged in the tablespace block of the block number equal to or prior to the maximum block number in which the record is arranged, the improvement in the performance of the DBMS 216 is intended by moving the physical block to the high-performance medium.

(FIG. 12: Step S1204)

This step is similar to step S704 of FIG. 7.

(FIG. 12: Steps S1200 to S1204: Supplement)

In this figure, it is assumed that the reorganization described in the process flow of FIG. 10 is executed by reinserting the records into the tablespace blocks in ascending order of the tablespace block number. It is also assumed that no record is arranged in the tablespace block of the block number subsequent to the maximum block number. If the reorganization process is different from FIG. 10, the physical block needs to be moved based on a criterion different from this figure. However, it is a common criterion that the physical block in which no record is arranged is moved to the low-performance medium and the physical block in which the record is arranged is moved to the high-performance medium.

Figure 13:
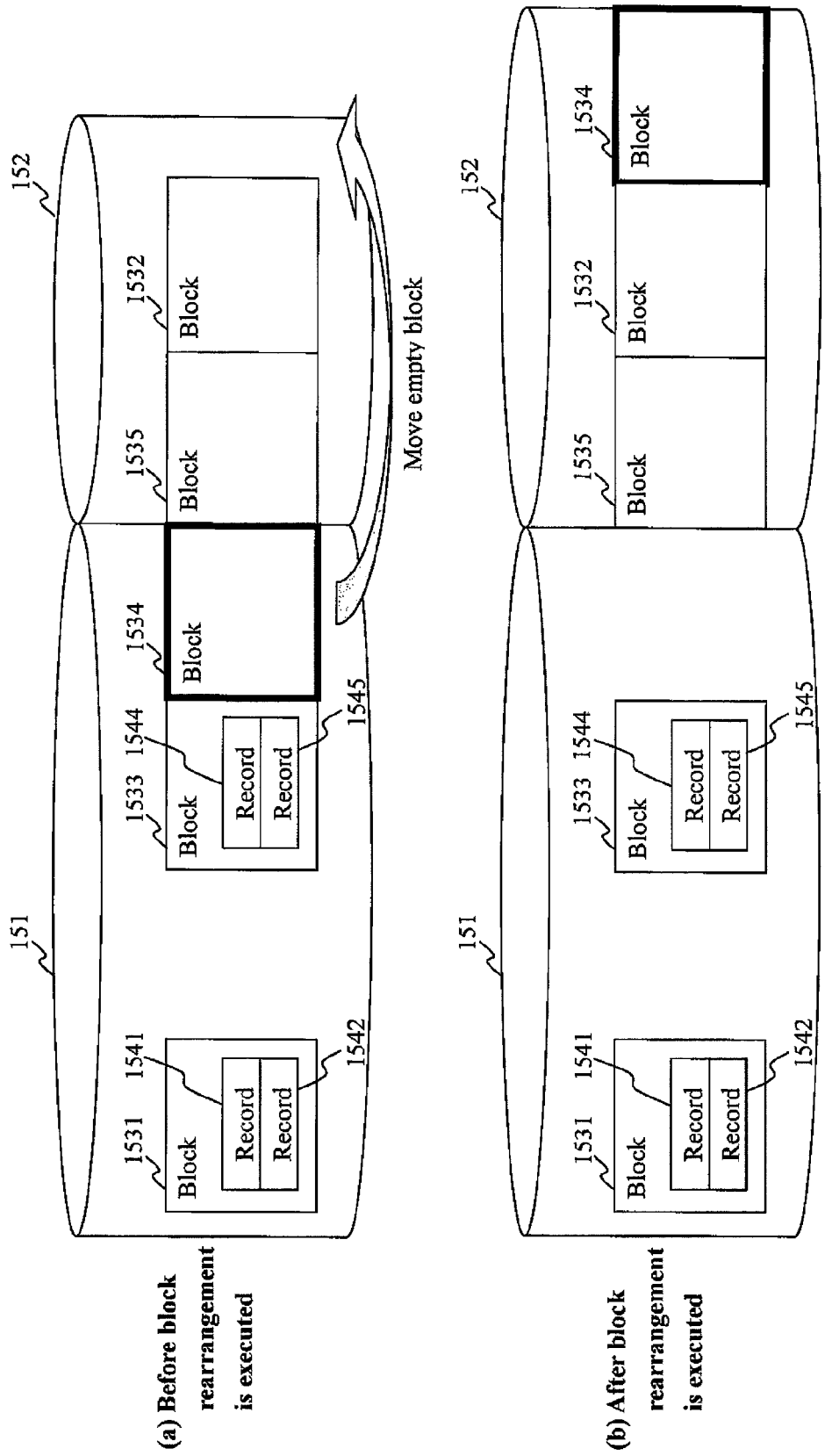
FIG. 13 is a diagram showing a situation where a physical block is moved according to the process flow of FIG. 12.

FIG. 13 is a diagram showing a situation where the physical block is moved according to the process flow of FIG. 12. Here, a state of the tablespace 153 after the reorganization described in FIG. 11 is assumed. FIG. 13(a) shows a state before the block is moved, and FIG. 13(b) shows a state after the block is moved. It should be noted that, in FIG. 13, since no record exists subsequent to the tablespace block 1533, the maximum block number is the block number of the tablespace block 1533.

In step S1202, the tablespace block 1534 which does not store the record is located on the storage device 151 (=the high-performance medium). The data movement module 125 moves the physical block corresponding to the tablespace block 1534, to the storage device 152 (=the low-performance medium).

In step S1203, the tablespace blocks 1531 and 1533 which store the records are located on the storage device 151 (=the high-performance medium). In this case, the data movement module 125 does not need to move the tablespace block.

Figures 14, 15:
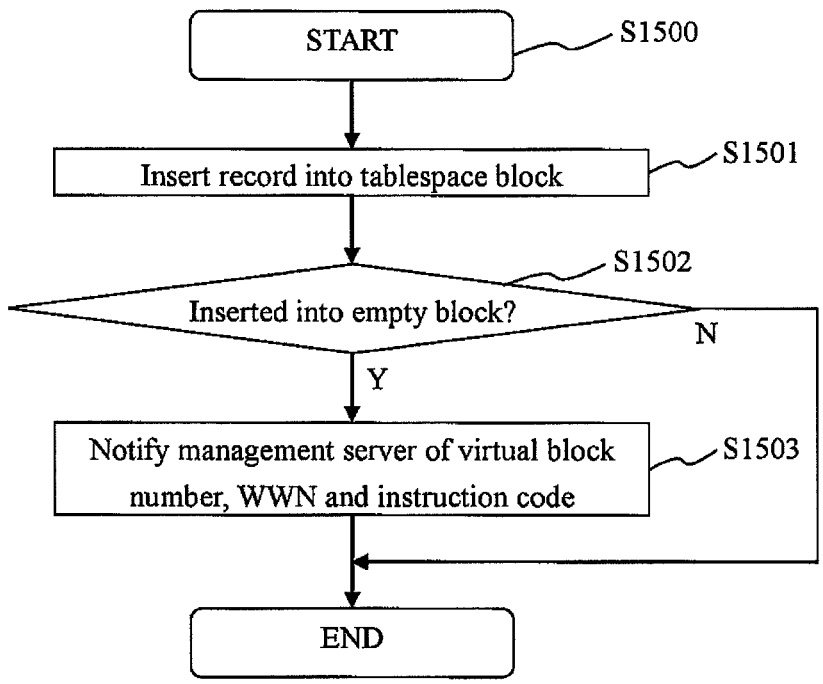
FIG. 14 shows a data example of the storage page map 121 updated by step S1204 of FIG. 12.
FIG. 15 is a diagram showing a process flow in which the database update program 217 in the DB server 210 newly inserts a record into the tablespace 153.

FIG. 14 shows a data example of the storage page map 121 updated by step S1204 of FIG. 12. Here, an example adapted to the data example of the storage page map 121 described in FIG. 9 is shown.

In the data example shown in FIG. 9, the physical block corresponding to the tablespace block 1534 corresponds to the physical block of "physical volume number=1" and "physical block number=4". As described in FIG. 13, since this block is moved to the storage device 152 of "physical volume number=2", the value of the corresponding line 4 of the physical volume number column 1213 is updated to "2".

The physical block number in the storage device 152 is assigned so as not to overlap other physical blocks. In the example shown in FIG. 13, since the tablespace block 1534 is rearranged as a third physical block of the storage device 152, the value of the physical block number column 1214 becomes "3".

Embodiment 2

Conclusion

As described above, when the storage apparatus 100 according to the present Embodiment 2 receives a notification that the records have been relocated by reorganizing the tablespace 153 by the DBMS 216, the storage apparatus 100 according to the present Embodiment 2 moves the empty physical block which does not have the record, to the low-performance medium. Thereby, similarly to Embodiment 1, it is possible to suppress the reduction in the performance, which is caused because the storage area which is not being used continues to exist in the high-performance medium.

Moreover, when the storage apparatus 100 according to the present Embodiment 2 receives the notification that the records have been relocated by reorganizing the tablespace 153 by the DBMS 216, the storage apparatus 100 according to the present Embodiment 2 moves the physical block having the record, to the high-performance medium. Thereby, the improvement in the performance of the DBMS 216 can be intended.

Embodiment 3

In Embodiment 3 of the present invention, the operations of each apparatus when the DBMS 216 in Embodiment 1 newly inserts the record into the tablespace 153 will be described. Other configurations of the storage system 1000 are similar to Embodiments 1 to 2.

FIG. 15 is a diagram showing a process flow in which the database update program 217 in the DB server 210 newly inserts the record into the tablespace 153. Hereinafter, each step of FIG. 15 will be described.

(FIG. 15: Step S1500)

The DBMS 216 issues an instruction indicating that the record should be newly inserted into the tablespace 153, to the database update program 217. When the database update program 217 receives the instruction from the DBMS 216, the database update program 217 starts this process flow.

(FIG. 15: Step S1501)

The database update program 217 specifies the number of the tablespace block into which the record should be inserted, according to a predetermined procedure, and inserts the record into the tablespace block.

(FIG. 15: Step S1502)

The database update program 217 checks whether or not the record has been inserted into an empty tablespace block in step S1501. If the record has been inserted into an empty tablespace block, this process flow proceeds to step S1503, and otherwise this process flow is terminated.

(FIG. 15: Step S1503)

The database update program 217 notifies the management server 300 of the number of the tablespace block (=the virtual block) into which the record has been inserted in step S1501, the WWN of the virtual storage medium, and an instruction code of a record insert command.

FIG. 16 is a diagram showing a process flow of the storage area relocation program 351 when the management server 300 has received the notification described in step S1503 from the DB server 210. Hereinafter, each step of FIG. 16 will be described.

(FIG. 16: Step S1600)

When the CPU 310 of the management server 300 receives the notification described in step S1503 from the DB server 210, the CPU 310 launches the storage area relocation program 351. The storage area relocation program 351 starts this process flow.

(FIG. 16: Step S1601)

The storage area relocation program 351 obtains the WWN, the virtual block number, and the instruction code (the record insert command), which have been notified by the DB server 210.

(FIG. 16: Step S1602)

This step is similar to step S702 of FIG. 7.

(FIG. 16: Step S1603)

The storage area relocation program 351 uses the value of the physical volume number column 1213 received in step S1602, as a key, to inquire the value of the medium class column 1222 of the medium class table 122. As a result of the inquiry, if it is found that the physical block whose number has been obtained in step S1602 is located on the low-performance medium, the storage area relocation program 351 instructs the storage apparatus 100 to move the physical block to the high-performance medium. According to the instruction from the management server 300, the data movement module 125 of the storage apparatus 100 moves the physical block from the low-performance medium to the high-performance medium.

(FIG. 16: Step S1603: Supplement)

This step has a purpose of avoiding the reduction in the performance of the DBMS 216, which is caused because the tablespace block having the record continues to exist in the low-performance medium.

(FIG. 16: Step S1604)

The storage area relocation program 351 instructs the storage apparatus 100 to update the storage page map 121 in accordance with the block arrangement after the physical block is moved. The storage apparatus 100 receives the instruction via the network I/F 160. According to the received instruction, the access I/F module 124 updates the storage page map 121.

FIG. 17 is a diagram showing a data example of the storage page map 121 in the present Embodiment 3. In the data example shown in the figure, the virtual storage device specified by "virtual volume number=1" is reserved across two storage devices specified by "physical volume number=1" and "physical volume number=2".

If the DBMS 216 has inserted the record into the tablespace block corresponding to "virtual volume number=1" and "virtual block number=3", the record is actually inserted into the physical block corresponding to "physical volume number=2" and "physical block number=1". Since the storage device corresponding to "physical volume number=2" is the low-performance medium, the physical block is intended to be moved to the high-performance medium according to the process flow of FIG. 16.

Figure 18:
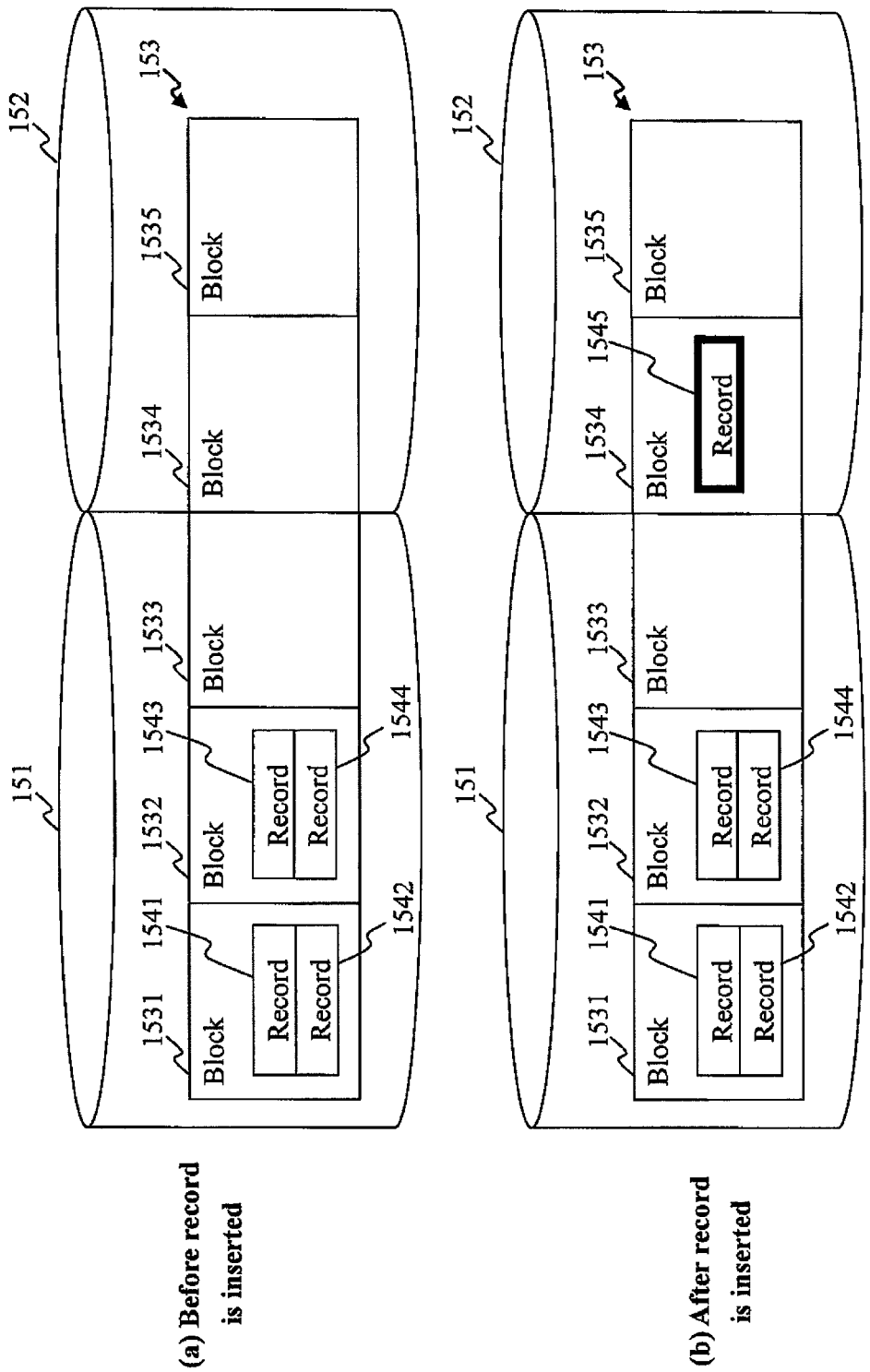
FIG. 18 is a diagram showing a situation where the record is inserted according to the process flow of FIG. 15.

FIG. 18 is a diagram showing a situation where a record is inserted according to the process flow of FIG. 15. Here, for ease of explanation, an example in which only the tablespace blocks 1531 and 1532 have records is shown. FIG. 18(a) shows a situation of each block before the record is inserted, and FIG. 18(b) shows a situation of each block after the record is inserted.

It is assumed that the database update program 217 inserts the records into the blocks in ascending order of the value of the virtual block number column 1212, in the virtual storage device specified by "virtual volume number=1". It is assumed that one tablespace block can store two records.

According to the data example of the storage page map 121 described in FIG. 17, the database update program 217 attempts to insert the records into the virtual blocks in order from the virtual block of "virtual block number=1", for the virtual storage device of "virtual volume number=1".

"Physical block number=1", that is, the tablespace block 1531 of FIG. 18 corresponds to the virtual block of "virtual block number=1". However, since two records have already been stored, the database update program 217 attempts to insert the record into a next virtual block.

Subsequently, the database update program 217 similarly attempts to insert the records into the virtual blocks in ascending order of the virtual block number. A first empty virtual block is a block of line 3 of FIG. 17, that is, the virtual block of "physical volume number=2" and "physical block number=1". A state where the record has been inserted into this block is shown in FIG. 18(b).

Figure 19:
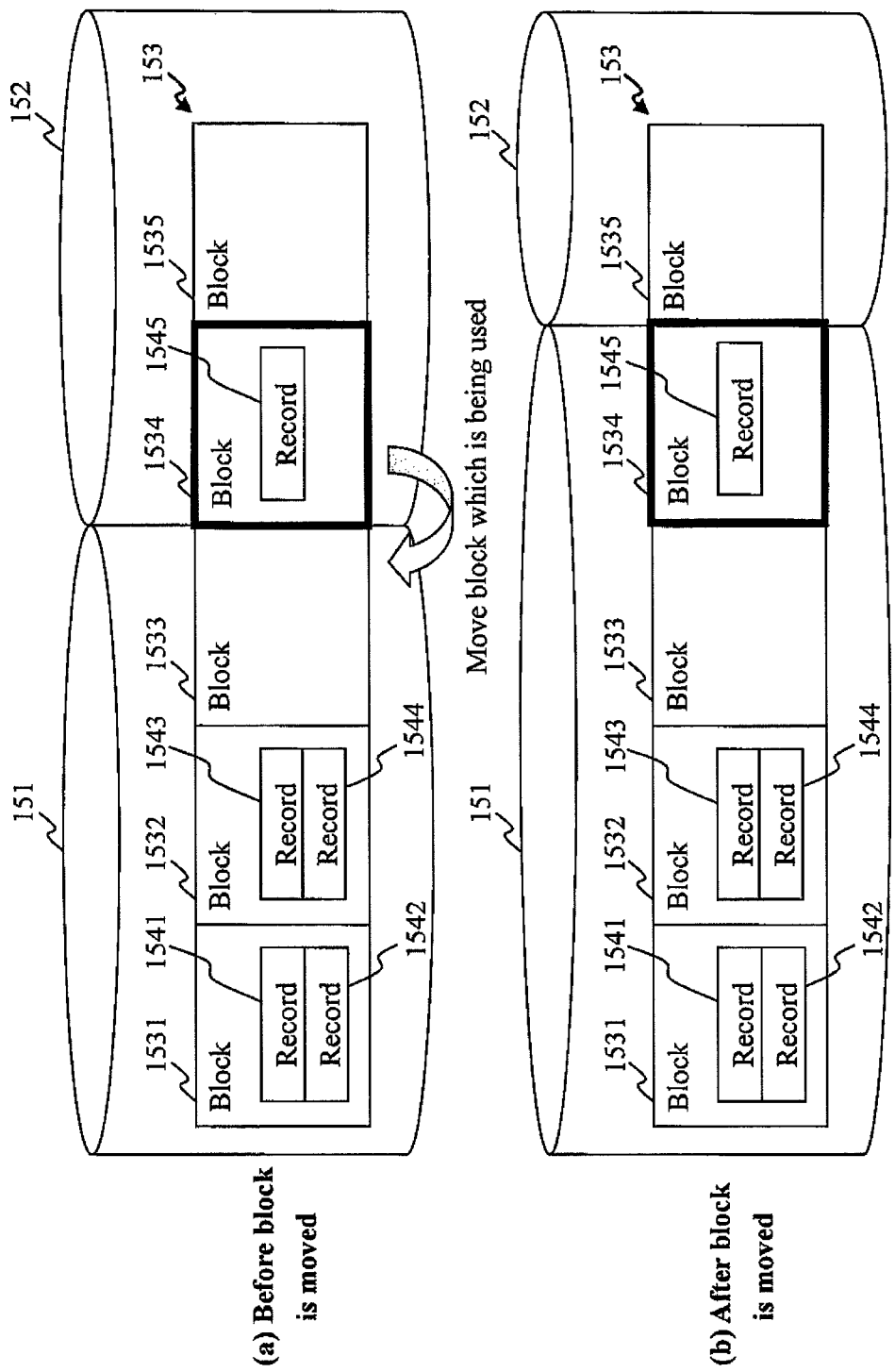
FIG. 19 is a diagram showing a situation where a block into which the record has been newly inserted is moved according to the process flow of FIG. 16.

FIG. 19 is a diagram showing a situation where the block into which the record has been newly inserted is moved according to the process flow of FIG. 16. FIG. 19(a) shows a situation before the block is moved, and FIG. 19(b) shows a situation after the block is moved.

In step S1603 of FIG. 16, since the tablespace block 1534 into which the record has been newly inserted is on the storage device 152 (=the low-performance medium), the data movement module 125 moves the tablespace block 1534 to the storage device 151.

FIG. 20 is a diagram showing a data example of the storage page map 121 in the block arrangement shown in FIG. 19. Since the tablespace block 1534 corresponding to data of line 3 of FIG. 17 has been moved to the storage device 151, the value of the corresponding physical volume number column 1213 has become "1". Moreover, since the tablespace block 1534 is a fourth physical block in the storage device 151, the value of the physical block number column 1214 has become "4".

Embodiment 3

Conclusion

As described above, when the storage apparatus 100 according to the present Embodiment 3 receives a notification that the record has been inserted into the empty physical block which does not store the record, the storage apparatus 100 according to the present Embodiment 3 moves the physical block to the high-performance medium. Thereby, the improvement in the performance of the DBMS 216 can be intended.

Embodiment 4

In the above Embodiments 1 to 3, the example has been shown in which the DB server 210 reserves the tablespace 153 on the storage apparatus 100 and uses the tablespace 153. However, the application using the storage apparatus 100 may not necessarily be the DBMS. For example, for an application using the storage apparatus 100 as a file server, an approach similar to Embodiments 1 to 3 can be used to improve a performance of the application.

Moreover, in the above Embodiments 1 to 3, the example has been described in which the tablespace 153 of the DBMS 216 is reserved as the storage areas on the storage apparatus 100. However, the storage areas to be reserved on the storage apparatus 100 may not necessarily be the tablespace 153. Under an arbitrary form of the storage areas employed by an application using the storage apparatus 100, the approach similar to Embodiments 1 to 3 can be used to improve the performance of the application.

Moreover, in the above Embodiments 1 to 3, the storage device 150 has been assumed to have the storage device 151 configured by using the high-performance medium, and the storage device 152 configured by using the low-performance medium. However, the configurations of the storage media are not limited thereto. Moreover, performance classifications are not limited to only two kinds including the high-performance/low-performance, and three or more levels of the performance classifications may be provided. In this case, the processor 130 or the management server 300 may determine to which storage medium the physical block is moved, as appropriate, for example, by providing a suitable threshold, or the like, depending on a size of the physical block, importance of the data or the like. Whatever performance classifications are provided, it is a common principle that a frequently used physical block is moved to the high-performance medium and a less frequently used physical block is moved to the low-performance medium.

REFERENCE SIGNS LIST

100 Storage apparatus
110 Disk controller
120 Control memory
121 Storage page map
1211 Virtual volume number column
1212 Virtual block number column
1213 Physical volume number column
1214 Physical block number column
122 Medium class table
1221 Physical volume number column
1222 Medium class column
123 WWN management table
1231 WWN column
1232 Virtual volume number column
124 Access I/F module
125 Data movement module
130 Processor
140 Cache memory
151 and 152 Storage devices
153 Tablespace
1531 to 1535 Tablespace blocks
1541 to 1545 Records
160 Network I/F
210 and 220 DB servers
211 CPU
212 Memory
213 Network I/F
214 Controller
215 Storage apparatus
216 DBMS
217 Database update program
218 Data I/F
300 Management server
310 CPU
320 Memory
330 Network I/F
340 Controller
350 Storage apparatus
351 Storage area relocation program
401 and 402 Data networks
403 LAN
1000 Storage system

The invention claimed is:

1. A storage apparatus for storing data, comprising:
a storage device configured by using a plurality of types of storage media having different performances;
medium class information which describes a correspondence relationship between the storage media and the types of storage media; and
a processor for writing data to the storage device or reading data from the storage device,
wherein the processor identifies the performances of the storage media according to a description of the medium class information, and moves a storage area, which is not being used, in storage areas reserved on the storage device, to a storage medium having a low performance in accordance with an instruction from an external device, the instruction being issued along with deletion of at least a part of records on a database management system using the storage apparatus.

2. A storage system, comprising:
a storage apparatus according to claim 1;
a management apparatus for managing an operation of the storage apparatus; and
a server apparatus for executing the database management program for writing data to the storage apparatus or reading data from the storage apparatus,
wherein the server apparatus:
reserves storage areas on the storage apparatus under the database management program;
notifies the management apparatus of contents of a data write process or a data read process for the storage areas reserved on the storage apparatus under the database management program;
notifies the management apparatus that data in the storage areas reserved on the storage device has been rearranged on the database management program; and
notifies the management apparatus that data has been written in the storage area which is not being used, in the storage areas reserved on the storage device, the management apparatus instructs the storage apparatus to move the storage area which is not being used, in the storage areas reserved on the storage device, to the storage medium having the low performance, based on the notification received from the server apparatus;
instructs the storage apparatus to move a storage area emptied by the rearrangement, in the storage areas reserved on the storage device, to the storage medium having the low performance, and also instructs the storage apparatus to move the storage area to which the data has been written by the rearrangement, in the storage areas reserved on the storage device, to the storage medium having a high performance, based on the notification received from the server apparatus; and
instructs the storage apparatus to move the unused storage area into which the data has been written, to the storage medium having the high performance, based on the notification received from the server apparatus, and the processor identifies the performances of the storage media according to the description of the medium class information;
if a notification that all data in the storage area reserved on the storage device has been deleted, is received from outside of the storage apparatus, moves the reserved storage area to the storage medium having the low performance;

if the notification that data in the storage areas reserved on the storage device has been rearranged, is received from the outside of the storage apparatus, moves the storage area emptied by the rearrangement, in the storage areas reserved on the storage device, to the storage medium having the low performance, and also moves the storage area to which the data has been written by the rearrangement, in the storage areas reserved on the storage device, to the storage medium having the high performance;

if the notification that data has been written to the storage area which is not being used, in the storage areas reserved on the storage device, is received from the outside of the storage apparatus, moves the unused storage area to the storage medium having the high performance;

provides a virtual storage device in which the plurality of types of storage media have been virtualized, to the outside of the storage apparatus; and if a request to write data to the virtual storage device is received, reflects contents of the request in the storage device, and also reflects the contents of the request on the virtual storage device.

3. The storage apparatus according to claim 1, wherein if a notification that all data in a storage area reserved on the storage device has been deleted, is received from outside of the storage apparatus, the processor moves the reserved storage area to the storage medium having the low performance.

4. The storage apparatus according to claim 1, wherein if a notification that data in the storage areas reserved on the storage device has been rearranged, is received from outside of the storage apparatus, the processor moves a storage area emptied by the rearrangement, in the storage areas reserved on the storage device, to the storage medium having the low performance.

5. The storage apparatus according to claim 1, wherein if a notification that data in the storage areas reserved on the storage device has been rearranged, is received from outside of the storage apparatus, the processor moves a storage area to which data has been written by the rearrangement, in the storage areas reserved on the storage device, to the storage medium having a high performance.

6. The storage apparatus according to claim 1, wherein if a notification that data has been written to a storage area which is not being used, in the storage areas reserved on the storage device, is received from outside of the storage apparatus, the processor moves the unused storage area to the storage medium having a high performance.

7. The storage apparatus according to claim 1, wherein the processor provides a virtual storage device in which the plurality of types of storage media have been virtualized, to outside of the storage apparatus, and if a request to write data to the virtual storage device is received, reflects contents of the request in the storage device, and also reflects the contents of the request on the virtual storage device.

8. A storage system, comprising:
a storage apparatus according to claim 1;
a management apparatus for managing an operation of the storage apparatus; and
a server apparatus for executing an application for writing data to the storage apparatus or reading data from the storage apparatus,
wherein the server apparatus notifies the management apparatus of contents of a process for writing data to the storage apparatus or reading data from the storage apparatus, and the management apparatus instructs the storage apparatus to move a storage area which is not being used, in the storage areas reserved on the storage device, to the storage medium having the low performance, based on the notification received from the server apparatus.

9. The storage system according to claim 8, wherein the server apparatus notifies the management apparatus that data in the storage areas reserved on the storage device has been rearranged on the application, and the management apparatus instructs the storage apparatus to move a storage area emptied by the rearrangement, in the storage areas reserved on the storage device, to the storage medium having the low performance, based on the notification received from the server apparatus.

10. The storage system according to claim 8, wherein the server apparatus notifies the management apparatus that data in the storage areas reserved on the storage device has been rearranged on the application, and the management apparatus instructs the storage apparatus to move a storage area to which data has been written by the rearrangement, in the storage areas reserved on the storage device, to the storage medium having a high performance, based on the notification received from the server apparatus.

11. The storage system according to claim 8, wherein the server apparatus notifies the management apparatus that data has been written to the storage area which is not being used, in the storage areas reserved on the storage device, and the management apparatus instructs the storage apparatus to move the unused storage area to which data has been written, to the storage medium having a high performance, based on the notification received from the server apparatus.

12. The storage system according to claim 8, wherein the server apparatus executes the database management program as the application;
reserves storage areas on the storage apparatus under the database management program; and
notifies the management apparatus of contents of a data write process, a data read process or a data rearrangement process for the storage areas reserved on the storage apparatus under the database management program.

* * * * *